(12) United States Patent
Nolin

(10) Patent No.: US 9,309,052 B2
(45) Date of Patent: *Apr. 12, 2016

(54) FLOW-RETARDING CHUTES AND SPOUTS AND METHOD FOR DELIVERING DRY BULK FREE-FLOWING MATERIAL TO A LOCATION

(71) Applicant: Karl W Nolin, Spencer, IA (US)

(72) Inventor: Karl W Nolin, Spencer, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/617,601

(22) Filed: Feb. 9, 2015

(65) Prior Publication Data

US 2015/0151916 A1 Jun. 4, 2015

Related U.S. Application Data

(63) Continuation of application No. 13/543,317, filed on Jul. 6, 2012, now Pat. No. 8,967,359.

(51) Int. Cl.
*B65G 11/16* (2006.01)
*B65G 11/02* (2006.01)
*B65G 11/20* (2006.01)

(52) U.S. Cl.
CPC ............ *B65G 11/166* (2013.01); *B65G 11/026* (2013.01); *B65G 11/206* (2013.01); *Y10T 29/49826* (2015.01)

(58) Field of Classification Search
CPC ...... B65G 11/16; B65G 11/166; B65G 11/20; B65G 11/206; B65G 11/026; B65G 11/02; B65G 11/186; B65G 11/18; Y10T 29/49826
USPC .................................................. 193/2 A, 32
See application file for complete search history.

(56) References Cited

U.S. PATENT DOCUMENTS

| | | | | |
|---|---|---|---|---|
| 2,634,842 A * | 4/1953 | Caylor | ................... | B65G 69/00 193/32 |
| 2,733,800 A * | 2/1956 | Fenske | ...................... | B03C 7/12 193/27 |
| 3,565,225 A * | 2/1971 | Fay | ....................... | A01D 46/243 193/25 R |
| 3,895,982 A * | 7/1975 | Persson | ................ | B65G 11/166 156/137 |
| 4,216,853 A * | 8/1980 | Poff | ...................... | B65G 11/206 193/32 |
| 4,390,090 A * | 6/1983 | Kossebau | ............... | B65D 90/54 193/32 |
| 4,410,076 A * | 10/1983 | West | ..................... | B65G 69/185 193/32 |
| 4,476,670 A * | 10/1984 | Ukai | ...................... | B65G 69/16 193/25 R |
| 4,552,573 A * | 11/1985 | Weis | ..................... | B65G 69/186 141/248 |
| 5,461,975 A * | 10/1995 | Driggs | ..................... | A01F 15/08 100/188 R |
| 6,041,906 A * | 3/2000 | Howard | ............... | B65G 11/166 193/2 R |
| 6,250,450 B1 * | 6/2001 | Howard | ............... | B65G 11/166 193/2 R |
| 6,684,999 B1 * | 2/2004 | Howard | ............... | B65G 11/166 193/2 R |
| 7,028,824 B1 | 4/2006 | Nolin | | |
| 7,581,629 B2 * | 9/2009 | Kohler | ................. | B65G 11/186 193/2 A |
| 8,967,359 B1 * | 3/2015 | Nolin | .................... | B65G 11/026 193/2 A |
| 2006/0237280 A1 * | 10/2006 | Ellis | ..................... | B65G 11/166 193/2 R |
| 2012/0088055 A1 * | 4/2012 | Davies | ................. | B65G 11/166 428/44 |
| 2012/0267214 A1 * | 10/2012 | Gabriel | ............... | F16L 37/2445 193/2 A |

* cited by examiner

*Primary Examiner* — Leslie A Nicholson, III
*Assistant Examiner* — Keith R Campbell
(74) *Attorney, Agent, or Firm* — Simmons Perrine Moyer Bergman PLC

(57) ABSTRACT

A system and method for causing a differential flow rate to exist in a downspout so as to reduce abrasion of a bottom side of said downspout and to sort dry bulk material flowing therethrough. The present invention reduces the velocity of the mass of the dry bulk material, such as corn, thus preserving grain quality and reducing the exit velocity at the lower end of the spout.

10 Claims, 2 Drawing Sheets

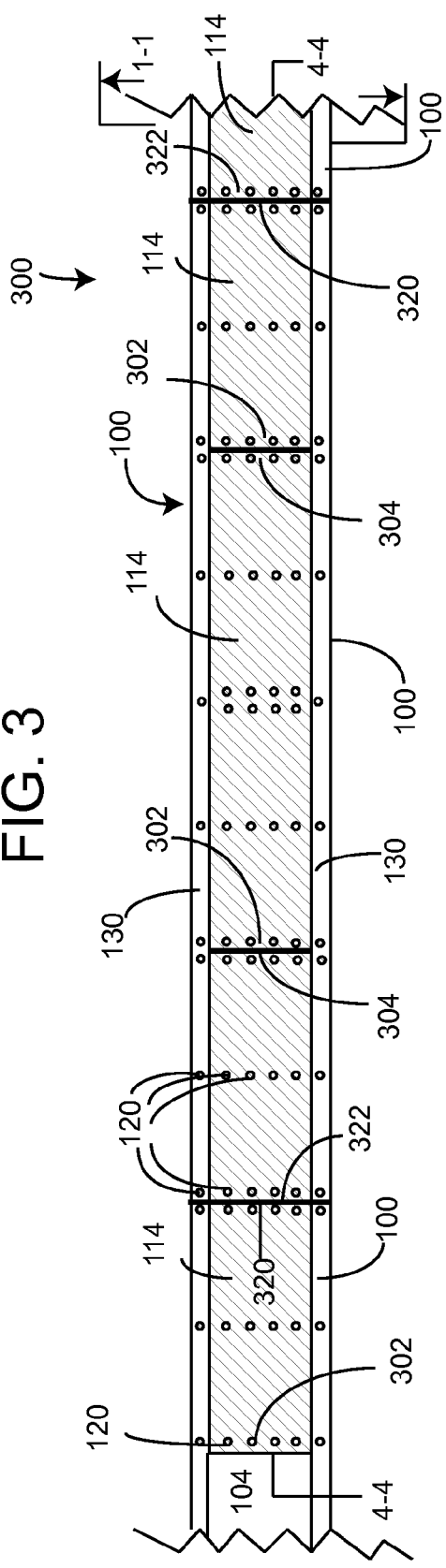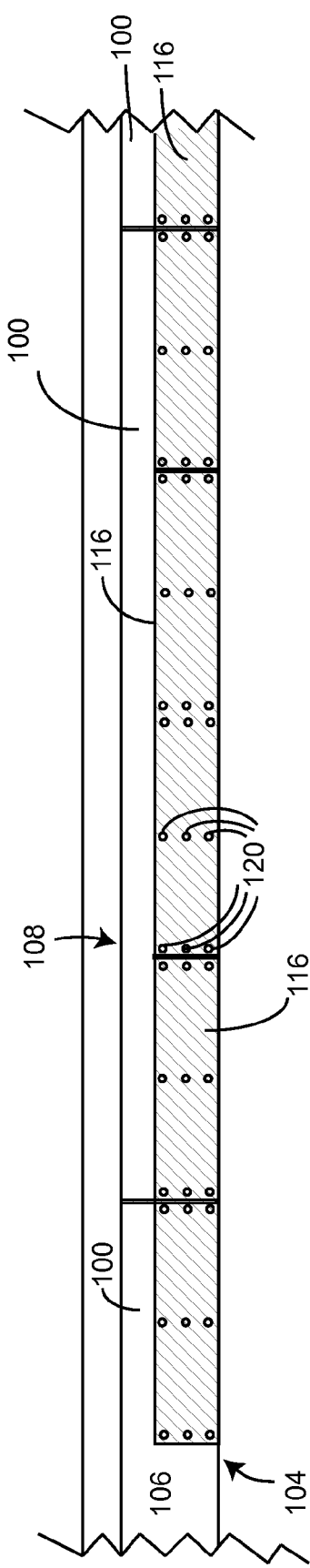

FLOW-RETARDING CHUTES AND SPOUTS AND METHOD FOR DELIVERING DRY BULK FREE-FLOWING MATERIAL TO A LOCATION

CROSS REFERENCE TO RELATED APPLICATIONS

This application claims the benefit of a utility application filed on Jul. 6, 2012, and having Ser. No. 13/543,317 entitled "FLOW-RETARDING CHUTES AND SPOUTS AND METHOD FOR DELIVERING DRY BULK FREE-FLOWING MATERIAL TO A LOCATION" which is hereby incorporated herein in its entirety by this reference.

FIELD OF THE INVENTION

The present invention generally relates to grain and dry bulk material handling, and more particularly relates to chutes and downspouts, and even more particularly relates to methods for constructing systems for conveying dry bulk material through a chute or downspout while reducing the speed at which material is flowing over the bottom surface of the chute or downspout.

BACKGROUND OF THE INVENTION

In recent years, grain elevators and feed mills have necessarily become increasingly efficient in their operations. Many customers of elevators and feed mills now operate on a "just-in-time" basis. Consequently, it is becoming increasingly important to minimize the duration of any elevator or mill downtime.

In the past, grain handling equipment manufacturers have manufactured downspouts and chutes which carry material from one position to another position. Typically, these downspouts were round and would wear out at their bottom surface because of the abrasion of the grain or other material flowing through the spout. Typically, these spouts would need to be rotated and/or replaced frequently, depending upon the nature of their use. One attempt to prolong the time between replacement of the downspouts has been to employ rectangular-shaped downspouts.

While these round and rectangular spouts have enjoyed much success and have been used extensively in the past, they do have some drawbacks.

First of all, the frequency of replacement or maintenance of these spouts has been less than desirable.

Secondly, maintenance, repair and/or replacement of these spouts often require considerable downtime for unloading, loading or transfer operations and depending upon the spout, may completely shut down the entire unloading operation while the replacement is performed.

Thirdly, because these downspouts are often very long and extremely heavy, they often require the use of a crane to support and lift the spouts.

U.S. Pat. No. 7,028,824 addresses many of these concerns. However, there is considerable labor involved in assembling the downspouts of the '824 patent with its numerous flow retarding members spanning the width of the downspout.

Consequently, there exists a need for improved methods and systems for providing, maintaining, repairing and replacing equipment for delivering dry bulk material in an efficient manner.

SUMMARY OF THE INVENTION

It is an object of the present invention to provide a system and method for delivering dry bulk material in an efficient manner.

It is a feature of the present invention to utilize an assembly of several chutes or downspouts with internal bottom surface flow-retarding panel members.

It is an advantage of the present invention to extend the service life of a chute or downspout.

It is another feature of the present invention to have said internal bottom surface flow-retarding members be replaceable laser cut, partially laminated abrasion resistant steel (ARS) bolt-in panels.

It is another feature of the present invention to stagger the connection point between adjacent ARS panels so that they do not coincide with joints between spouts or chutes.

It is another advantage of the present invention to permit flange-less interconnection of chutes and downspouts.

It is another advantage of the present invention to reduce the need for welding flanges on previously galvanized chutes and downspouts.

It is another advantage of the present invention to permit bolt shaft hole drilling through laminated portions of the ARS panels.

It is yet another feature of the invention to provide for variably configured and sized holes in the flow-retarding members so as to adapt the system for differing types of dry bulk material.

It is another advantage of the invention to tailor performance of the system of the present invention to particular uses.

The present invention is an apparatus and method for delivering dry bulk material to a different position, designed to satisfy the aforementioned needs, provide the previously stated objects, include the above-listed features, and achieve the already articulated advantages. The present invention is carried out in a "wasted time-less" manner in a sense that the time consumed in replacing chutes and spouts has been greatly reduced. The present invention is also carried out in flange-less manner, in the sense that some flanges used to connect adjacent spouts or chutes have been eliminated.

Accordingly, the present invention is a system and method including a spout having a bottom chute liner with structure therein configured for trapping and catching material therein and thereby retarding flow of the material adjacent to the bottom chute liner.

BRIEF DESCRIPTION OF THE DRAWINGS

The invention may be more fully understood by reading the following description of the preferred embodiments of the invention, in conjunction with the appended drawings wherein:

FIG. 3 is a top or plan view of the drag conveyor housing of FIG. 1 after the top has been removed.

FIG. 4 is a side or elevation view of the drag conveyor housing of FIGS. 1 and 3.

DETAILED DESCRIPTION

Figure 1:
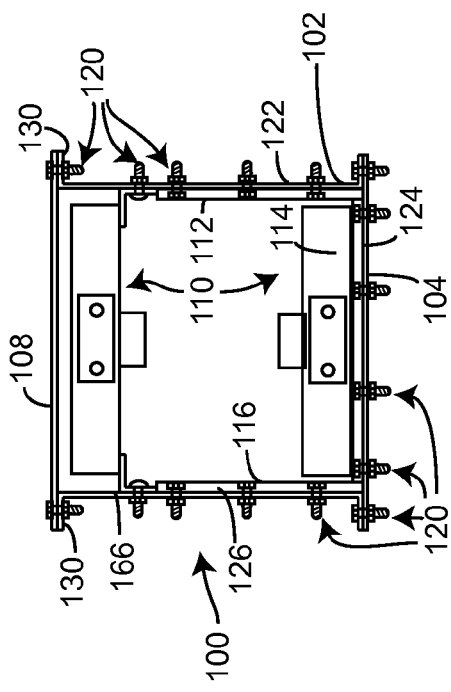
FIG. 1 is an end view of a drag conveyor housing of the present invention.

Now referring to the drawings wherein like numerals refer to like matter throughout, and more specifically referring to FIG. 1, there is shown an end view of chute 100 of the present invention, which is taken on line 1-1 of FIG. 3, which chute 100 is shown here as a rectangular drag conveyor housing, but other types and shapes of chutes and spouts could be used as well. Chute 100 includes a right side 102 which can be a single piece of material made to have a "U" shape with a housing top receiving portion 130 and a similar lip on its bottom end. Bottom 104 is coupled to right side 102 and left side 106 with a series of spaced apart bolts 120. The combination of bottom 104, right side 102 and left side 106 form a channel of the chute 100. Top 108 is shown in FIG. 1 coupled to right side 102 and left side 106. The materials and methods used to manufacture chute 100, including right side 102, bottom 104, left side 106, top 108 and the bolts 120 used to couple the sides together could be similar to those which were used in various prior art drag conveyor housings. Optionally, disposed within chute 100 is a plurality of paddles 110 and other structure for moving and guiding the paddles 110 within the chute 100. A key aspect of the present invention is that the chute 100 is lined so as to reduce failures and/or maintenance associated with friction of the dry bulk material moving therein. Bottom liner 114 is shown with a bottom backer plate 124 coupled thereto. Bottom backer plate 124 is needed only in the areas around where bolts 120 will be used. Bottom liner 114 is preferably a ¼ inch thick AR400 Abrasion Resistant Steel plate that has been laser cut to create an array of spaced apart holes which are sized and configured to capture some of the dry bulk material therein and at least temporarily hold some of the dry bulk material so as to create a relatively static layer of material adjacent the bottom liner 114 with a faster moving flow above the static layer. This results in the faster moving material wearing against the dry bulk material in the more static layer and thereby creating material on material friction instead of material on chute or chute liner friction with its known deleterious consequences. Bottom backer plate 124 may be a thinner and easier to cut and drill material than the AR400 or other wear material such as hardened steel bottom liner 114. For example, bottom backer plate 124 may be a 14 gauge plate which is laminated (welded) to the bottom liner 114 after the laser cut holes are created, so as to at least partially cover some of laser cut holes which extend completely through the bottom liner 114. Preferably, bolts 120 with hex heads or any other shaped heads such as square are recessed into a matching hole in the ¼ inch bottom liner 114. The underlying bottom backer plate 124 has a smaller round hole to receive the shaft of the bolts 120 but too small to allow the heads of bolts 120 to go through.

Figure 2:
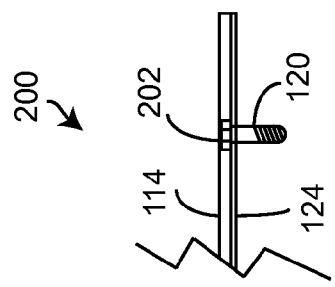
FIG. 2 is an enlarged portion of FIG. 1.

This relationship between the bottom liner 114, bolts 120 and bottom backer plate 124 can be more readily understood by referring to FIG. 2.

Now referring to FIG. 3, there is shown an assembly, generally designated 300, of the present invention which includes a full chute 100 (which could be 120 inches in length or other suitable length), disposed centrally in FIG. 3 and two partial chutes 100 disposed on either end of the central chute 100. Chute 100 is shown from the top down with the top 108 having been removed. The top horizontal lines and the bottom horizontal lines in FIG. 3 are the outside edges of the housing top receiving portion 130 of right side 102 and left side 106. Disposed inside of chutes 100 are two full and one partial bottom liner 114. At the left side of FIG. 3 chute 100 is unlined for a short distance. Bottom liner 114 has a liner left side end 302 which is bolted to the bottom 104 via a plurality of bolts 120. The left most bottom liner 114 is shown ending with liner right side end 304 which abuts the central bottom liner 114 at its liner left side end 302. Both bottom liners 114 are bolted to the bottom 104 at their respect ends. Also shown are a series of intermediate lines of bolts 120 at approximately 15 inch intervals, i.e.; there are 3 intermediate lines of bolts 120 between the liner left side end 302 and the liner right side end 304 of each respective bottom liner 114 which are shown as being 60 inches in length or ½ the length of the chutes 100. Midway in the leftmost bottom liner 114 there is shown two adjacent parallel lines of bolts which go through the bottom 104 at the ends 320 and 322 of the bottom liner 114, this occurs at about 30 inch intervals. This bolting of adjacent chutes to the same bottom liner 114 which extends between them provides for the ability to have a stable flangeless connection between adjacent chutes 100. Bottom liner 114 is shown with hatch marks and it does not show the array of laser cut holes for retarding the movement of material immediately adjacent to the surface of bottom liner 114. The size and configuration of these holes can be made different for chutes which carry different types of dry bulk material.

Now referring to FIG. 4, there is shown a side view of the chute 100 taken on line 4-4 of FIG. 3. The left side liner 116 is shown bolted to the left side 106, via a series of parallel lines of bolts 120 which are in registration with the lines of bolts 120 through bottom 104. This registration need not exist and in some embodiments it may be staggered with respect to the lines of bolts 120 through the bottom 104. Left side liner 116 is shown not extending to the top of the left side 106. In a chute or spout that does not have a conveyor therein, it may be desirable to extend left side liner 116 to the top of left side 106.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

I claim:

1. A system for delivery of dry bulk material, the system comprising:
    a chute having a top side, a bottom side, a right side and a left side, the chute for carrying a dry bulk material;
    a liner member disposed in said chute and spanning a space near said bottom side and between said right side and said left side;
    means for retaining said liner member at a predetermined location;
    where said liner member is a plate;
    a plurality of chutes and a plurality of liner members disposed in said plurality of chutes;
    wherein a connection between adjacent chutes in said plurality of chutes is made without a benefit of a chute terminal end butting flange on each of said adjacent chutes for coupling said adjacent chutes; and
    wherein one of said plurality of liner members spans and provides a fixed connection between adjacent chutes.

2. A system for delivery of dry bulk material, the system comprising:
    a plurality of chutes and a plurality of liner members disposed in said plurality of chutes;
    a first chute of said plurality of chutes having a top side, a bottom side, a right side and a left side, the first chute for carrying a dry bulk material;
    a first liner member of said plurality of liner members disposed in said first chute and spanning a space near said bottom side and between said right side and said left side;
    means for retaining said first liner member at a predetermined location;
    where said first liner member is a plate;
    wherein a connection between adjacent chutes in said plurality of chutes is made without a benefit of a chute terminal end butting flange on each of said adjacent chutes for coupling said adjacent chutes;

wherein said first liner member is a plate of abrasive resistant steel;
wherein:
each of said plurality of liner members comprise a partially laminated plate of 400AR abrasive resistant steel with a backer plate welded thereto;
said means for retaining comprising a plurality of bolts; and
said backer plate being configured for permitting a shaft of a bolt of said plurality of bolts to pass therethrough while prohibiting a head of bolt to pass.

3. The system of claim 1 wherein:
said means for retaining liner members comprises a plurality of bolts and nuts; and
one of said plurality of liner members comprises a plate of abrasive resistant steel.

4. A method of manufacturing a system which is configured for carrying dry bulk material, the method comprising the steps of:
providing a first chute with a top side, a bottom side, a right side and a left side, the chute for carrying a dry bulk material;
providing a first liner plate within said first chute along said bottom side which substantially spans from said right side to said left side;
connecting said first liner plate to said bottom side;
providing a second chute; and
coupling said second chute to said first chute without the use of flanges on said first chute and said second chute, and by coupling said second chute to a portion of said first liner plate which protrudes beyond an end of said first chute.

5. A method of claim 4 further comprising the step of providing a top disposed on said right side and said left side to make an enclosed chute.

6. A method of claim 4 wherein said first liner plate comprises a plate having a plurality of flow retarding features.

7. A system for delivering dry bulk material from an elevated location comprising:
a source of dry bulk material;
a downspout extending downward from said source of dry bulk material;
said downspout comprising:
a top side;
a bottom side;
a first side, coupled to said top side;
a second side coupled to said top side; and
a liner plate disposed adjacent to said bottom side;
wherein said liner plate extends beyond an end of said bottom side.

8. A system of claim 7 further comprising a chute coupled to said downspout via a flange-less connection through a portion of said liner plate which extends beyond an end of said bottom side.

9. A system of claim 8 wherein said downspout has a rectangular cross section which is substantially identical to a rectangular cross section of said chute.

10. A system of claim 9 wherein said liner plate is a laser cut galvanized partially laminated plate of 400AR abrasion resistant steel.

\* \* \* \* \*